United States Patent
Shirley (12)

(10) Patent No.: US 6,229,619 B1
(45) Date of Patent: May 8, 2001

(54) COMPENSATION FOR MEASUREMENT UNCERTAINTY DUE TO ATMOSPHERIC EFFECTS

(75) Inventor: Lyle Shirley, Boxboro, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/325,177

(22) Filed: Jun. 3, 1999

Related U.S. Application Data

(63) Continuation-in-part of application No. 09/241,354, filed on Feb. 2, 1999, now Pat. No. 6,031,612, which is a continuation-in-part of application No. 08/600,216, filed on Feb. 12, 1996, now Pat. No. 5,870,191.

(60) Provisional application No. 60/087,960, filed on Jun. 4, 1998.

(51) Int. Cl.[7] ............................................. G01B 9/02

(52) U.S. Cl. ........................................................ 356/517

(58) Field of Search .......................... 356/345, 357, 356/359, 360, 353, 349, 358, 486, 496, 500, 517

(56) References Cited

U.S. PATENT DOCUMENTS

| | | | |
|---|---|---|---|
| 3,472,598 | * 10/1969 | Hossmann | 356/361 |
| 4,139,304 | 2/1979 | Redman et al. | 356/358 |
| 4,298,286 | 11/1981 | Maxey et al. | 356/381 |
| 4,349,277 | 9/1982 | Mundy et al. | 356/376 |
| 4,499,492 | 2/1985 | Hutchin | 358/107 |
| 4,781,455 | 11/1988 | Machler et al. | 356/34 |
| 4,832,489 | 5/1989 | Wyant et al. | 356/359 |
| 5,146,293 | 9/1992 | Mercer et al. | 356/356 |
| 5,289,264 | 2/1994 | Steinbichler | 356/376 |
| 5,455,670 | 10/1995 | Payne et al. | 356/5.1 |
| 5,585,922 | 12/1996 | Sueyoshi et al. | 356/358 |

FOREIGN PATENT DOCUMENTS

| | | |
|---|---|---|
| 2554086 | 6/1977 | (DE) . |
| 0657713 | 6/1995 | (EP) ................................. G01B/9/02 |
| 0831568 | 3/1998 | (EP) ................................. H01S/3/109 |
| 2142427 | 1/1985 | (GB) . |
| 58-173412 | 10/1983 | (JP) . |
| 61-198009 | 9/1986 | (JP) . |
| 97/29341 | 8/1997 | (WO) . |

OTHER PUBLICATIONS

Butters, Von J. N., "Using the Laser to Measure Length," *Materialprüf*, 24:245–248 (Jul. 7,1982) (German Abstract).

Zou et al., "Two–Wavelength DSPI Surface Contouring Through the Temperature Modulation of a Laser Diode," *Optik*, 94(4):155–158 (1993).

Peng et al., "A Simplified Multi–Wavelength ESPI Contouring Technique Based on a Diode Laser System," *Optik*, 91(2)81–85 (1992).

(List continued on next page.)

*Primary Examiner*—Frank G. Font
*Assistant Examiner*—Amanda Merlino
(74) *Attorney, Agent, or Firm*—Testa, Hurwitz & Thibeault, LLP

(57) ABSTRACT

An apparatus and method for compensating for measurement uncertainty due to atmospheric effects. In one embodiment the apparatus includes two sources separated by a predetermined distance and two target locations separated by a predetermined distance. The radiation at the target locations is combined to form an interference pattern onto a detector which generates a signal corresponding to the measurement having a substantially reduced error due to atmospheric effects such as temperature variations. In another embodiment the radiation from the sources crosses somewhere in the measurement environment as it propagates toward the target locations. In yet another embodiment the separation between the two sources is substantially the same as the separation between the two target locations.

34 Claims, 6 Drawing Sheets

OTHER PUBLICATIONS

Fercher et al., "Two–Wavelength Speckle Interferometric Technique for Rough Fase Contour Measurement," *Optical Engineering*, 25(5):623–626 (May 1986).

Fercher et al., "Rough Surface Interferometry with a Two–Wavelength Heterodyne Speckle Interferometer," Applied Optics, 24(14):2181–1288 (Jul. 15, 1985).

Thalmann et al., "Dimensional Profiling by Electronic Phase Measurement," *SPIE Industrial Laser Interferometry*, 746:61–68 (1987).

Takeda et al., "Fourier–Transform Speckle Profilometry: Three–Dimensional Shape Measurements of Diffuse Objects with Large Height Steps and/or Spatially Isolated Surfaces," *Applied Optics*, 33(34):7829–7837 (Dec. 1, 1994).

Volotovskaya, N.K., "Relationship Between the Freqency and Angular Correlation Function of a Signal that is Scattered by an Extensive Body," *Radio Egineering and Electronic Physics J.* 16 (6):1048–1049 (Jun. 1971).

Dresel et al., "Three–Dimensional Sensing of Rough Surfaces by Coherence Radar," *Applied Optics*, 31(7):919–925 (Mar. 1, 1992).

Shirley et al., "Advanced Techniques for Target Discrimination Using Laser Speckle," *Massachusetts Institute of Technology, The Lincoln Laboratory J.*, 5(3):367–440 (1992).

Shirley, L. G., "Applications of Tunable Lasers to Laser Radar and 3D Imaging," *Technical Report 1025, Massachusetts Institute of Technology, Lincoln Laboratory*, (1995), pp. 1–121.

K. Creath, "Phase–measurement interferometry techniques," *Chap. 5 in Progress in Optics XXVI*, E. Wolf Ed. pp. 349–393, Elsevier Science Publishers, New York, NY (1988).

G.T. Reid, R.C. Rixon, and H.I. Messer, "Absolute and comparative measurements of three–dimensional shape by phase measuring moire topography," *Optics and Laser Technology*, 315–319, Dec., (1984).

G. Indebetouw, "Profile measurement using projection of running fringes," *Applied Optics*, 17(18), 2930–2933 (1978).

V. Srinivasan, H.C. Liu, and M. Halioua, "Automated phase–measuring profilometry of 3–D diffuse objects," *Applied Optics*, 23(18), 3105–3108 (1984).

L.S. Wang, B.N. Dobbins, K. Jambunathan, and X.P. Wu, "Fibre optic shape measuring system using phase stepping speckle pattern interferometry," *SPIE*, 2088, MJ. Downs Ed., pp. 104–110 (1993).

L.H. Bieman, "Absolute measurement using field shifted moire," SPIE, 1614, 259–264 (1991).

H.O. Saldner and J.M. Huntley, "Temporal phase unwrapping: application to surface profliing of discontinuous objects," *Applied Optics*, 36(13), 2770–2775 (1997).

K. Creath, "Phase–shifting speckle interferomety," *Applied Optics*, vol. 24, No. 18, (1985).

J.M. Huntley and H.O. Saldner, "Shape measurement by temporal phase unwrapping and spatial light modulator–based fringe projector," *SPIE*, vol. 3100, 185–192, (1997).

R.W. Wygant, S.P. Almeida, O.D.D. Soares, "Surface inspection via projection interferometry," *Applied Optics*, vol. 27, No. 22, (1988).

D. Paoletti and S. Spagnolo, "Fast Fourier Transformed Electronic Speckle Contouring for Diffuse Surfaces Profilometry," *Optics and Lasers in Engineering*, 20, 87–96, (1994).

G. Sansoni, L. Biancardi, U. Minoni, F. Docchio, "A Novel, Adaptive System for 3–D Optical Profilometry Using a Liquid Crystal Light Projector," *IEEE Transactions on Instrumentation and Measurement*, vol. 43, No. 4, (1994).

M. Chang, C. Ho, C. Hu, "A Design for an Optical Coordinate Measuring Machine System," *Proc. Natl. Sci. Counc. ROC(A)*, vol. 18, No. 5, 477–484, (1994).

C. Joenathan, B. Pfister, H.J. Tiziani, "Contouring by electronic speckle pattern interferometry employing dual beam illumination," *Applied Optics*, vol. 29, No. 13, (1990).

International Search Report.

\* cited by examiner

COMPENSATION FOR MEASUREMENT UNCERTAINTY DUE TO ATMOSPHERIC EFFECTS

CROSS REFERENCE TO RELATED APPLICATIONS

This application is a continuation-in-part of U.S. patent application Ser. No. 09/241,354 which was filed on Feb. 2, 1999 now U.S. Pat. No. 6,031,612 which was a continuation-in-part of U.S. patent application Ser. No. 08/600,216 now U.S. Pat. No. 5,870,191 which was filed on Feb. 12, 1996 and claims priority to provisional U.S. patent application No. 60/087,960 which was filed Jun. 4, 1998.

GOVERNMENT SUPPORT

Work described herein was supported by Federal Contract No. F19628-95-L-002, awarded by the United States Air Force. The Government may have certain rights in the invention.

FIELD OF THE INVENTION

The invention relates to the field of metrology, and more specifically to optical non-contact position measurement.

BACKGROUND OF THE INVENTION

Precise non-contact measurement of the deformation or displacement of objects is critical when active or passive compensation for the deformation or displacement is required. For example, large parabolic dishes used for communication, radar or telescopes are susceptible to many natural influences which distort the shape of the dishes. Some of these natural influences include wind, gravitational forces which can cause the dish to sag depending on the orientation of the dish, and temperature variations in the dish which can distort the shape of the dish, etc. To compensate for these effects, several solutions may be employed. One such solution is to use mechanical actuators on a segmented dish with an array of detectors mounted in different locations on the dish. As the detectors sense a change in the shape of the dish, the actuators respond by moving segments of the dish to correct the shape of the dish. A large disadvantage of this technique is the amount of cables and other electrical components which need to be mounted to the dish to perform the compensation. Another solution involves using mathematical techniques to correct the received signal as reflected by the deformed surface. This technique is of limited usefulness since the distortions in the dish are typically not uniform and cannot always be accurately modeled. These measurements can also be applied to other structures where deformations are studied, such as building surfaces, airplane surfaces, space shuttle surfaces, and surfaces of automobiles. In each case, the amount of surface deformation must be accurately measured so that the correct amount of compensation can be applied. These measurements can effect the design of wings on an airplane or the rear spoiler on a racing car, for example.

Other techniques for measuring deformations in the surface of objects include using laser range finders which provide precise measurement information. Typically it is cost prohibitive to use many of these laser range finders to simultaneously measure many points on the surface. More practically these range finders are used for individual sequential measurements at different points on the surface of the object. Hence, the measurements are not made simultaneously. Also, these laser range finders are sensitive to temperature changes in the atmosphere along the z-axis in FIG. 1. Temperature variations between the left side of FIG. 1 and the right side of FIG. 1, or bulk temperature changes along the entire path L can severely compromise the measurement accuracy of these laser trackers.

Another measurement technique projects a fringe pattern on a detector which is mounted to the surface to be measured. As the surface deforms, the detector moves and sweeps across the fringe pattern. By detecting the changes in the light intensity, the deformation of the surface can be determined. Although this technique provides a relatively inexpensive way to simultaneously detect relative displacement of a surface, it is sensitive to temperature variations in the atmosphere as well, but in the direction of the x-axis in FIG. 1. In other words, the temperature sensitivity of this technique is to temperature variations in the direction displacements are being measured. Therefore, this measurement technique is sensitive to temperature gradients. Those gradients result in shifts in the fringe pattern at the detector independent of the relative motion of the detector and the fringe pattern. Note that this technique is not sensitive to temperature variations along the z-axis as shown in FIG. 1.

These optical techniques are susceptible to temperature variations in the atmosphere because those temperature changes cause index of refraction variations. These index of refraction variations cause light traveling through the atmosphere to bend. The amount of this bending depends on the severity of the refractive index variations. The measurement techniques discussed above do not compensate for these refractive index variations. Thus, the measurement result is not as precise as it would be without refractive index variations in the atmosphere. Therefore, non-contact techniques for measuring surface deformation or distortion cannot identify whether the distortion is due to the wind, gravity, or atmospheric effects affecting the measurement equipment.

The present invention provides a method and apparatus for compensating for atmospheric effects that typically plague measurement equipment. The technique is useful in precise non-contact measurement of surface distortion without adding the uncertainty of refractive index changes in the atmosphere. The technique could also be used in precision land surveying, to aid in the building of a linear accelerator, or any situation where precise straightness measurements are required. The technique may be used to compensate for measurement uncertainty due to atmospheric refractive index effects.

SUMMARY OF THE INVENTION

The invention relates to an apparatus and method for compensating for measurement error due to refractive index variations in the measurement environment. In one embodiment the apparatus includes two sources separated by a predetermined distance and two target locations separated by a predetermined distance. The radiation at the target locations is combined to form an interference pattern onto a detector which generates a signal which corresponds to the measurement having substantially reduced error due to refractive index variations in the measurement environment. In another embodiment, the radiation from the two sources crosses somewhere in the measurement environment before reaching the two target locations. In yet another embodiment, the distance separating the two sources is substantially equal to the distance separating the two target locations. In yet another embodiment, the two sources are generated from a single source. The source(s) could be broadband or laser.

In one embodiment, the two sources and the two target locations are substantially adjacent to each other. The radiation from the sources is directed back from a target reflector towards the sources and is combined to form an interference pattern onto a detector which generates a signal which corresponds to the measurement having substantially reduced error due to refractive index variations in the measurement environment.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF THE INVENTION

Figure 1:
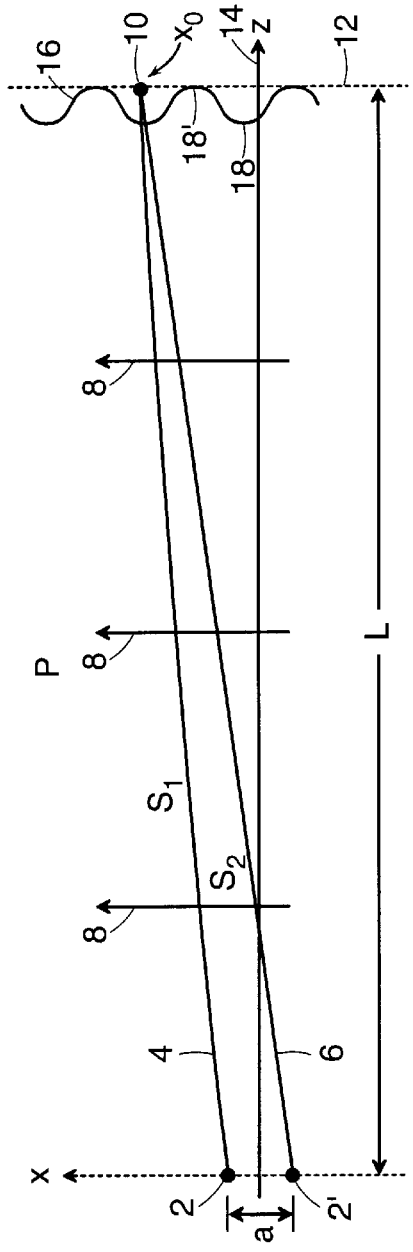
FIG. 1 is an embodiment of a measurement system which uses a measurement technique known to the prior art.

In brief overview and referring to FIG. 1, one prior art measurement technique for measuring displacement of the surface of an object is shown. In order to measure the displacement of a point 10 on the detector 12, two sources of radiation 2, 2' can be used. The two sources of radiation 2, 2' must be coherent with respect to one another. As the two sources of radiation 2, 2' irradiate the detector 12, they produce an interference pattern 16 on the detector 12. The interference pattern 16 consists of regions of varying intensity 18, 18'; each region represents a fringe period of the repeated interference pattern 16. As the point 10 is displaced in the x direction, the detector 12 senses the movement of the point 10 with respect to the interference pattern 16. The detector 12 is sensitive to the intensity variations of the fringes so it can detect movement within the same fringe period. The detector 12 can also detect movement through whole fringe periods so determining larger displacements of the point 10 is relatively straightforward and involves counting fringe periods as they pass over the detector 12.

Although the technique described above can measure the relative displacement of the point 10, it cannot identify whether the fringe shifts were due to the actual displacement of the detector or due to atmospheric effects, or a combination of the two. This is because as the temperature changes in the measurement environment (i.e. the atmosphere), so does the refractive index of the environment and the beams 4 and 6 will refract differently in the changing temperature environment. This beam refraction will shift the interference pattern 16 on the detector 12. The detector 12 will thereby sense a false change in the displacement of point 10 and report that artificial displacement causing the measurement to be imprecise.

Turning again to FIG. 1, the optical path length difference between beams $s_1$ and $s_2$ is described by the equation:

$$OPD = s_2 - s_1 \quad (1)$$

where $s_1$ and $s_2$ are optical path lengths that involve the integral of the path length multiplied by the refractive index at each point along the length.

In a uniform temperature gradient in the x direction, this can also be represented by the expansion:

$$OPD \approx (an_0/L)x_0 - (P_0 L/2)a + \quad (2)$$

where $P_0$ represents the uniform temperature gradient described as the derivative of the refractive index (n) with respect to the x direction, substantially perpendicular to a bisector of the sources 2, 2'. The term $P_0$ is difficult to ascertain. The nominal refractive index in the measurement environment is $n_0$. The distance between the sources 2, 2' is a, and L is the distance between the z=0 plane of the sources 2, 2' and the z=L plane of the target locations 20, 20'. The term $x_0$ is the unknown displacement. The higher order terms in equation 2 have negligible effect and can be ignored when a is much less than L. The first term in equation 2 consists of known quantities except for $x_0$ which is the unknown displacement. The second term in the equation includes the term $P_0$ which as discussed above is the derivative of n with respect to the x direction. That is, this term represents the change in refractive index with respect to x and is difficult to discern.

Figure 2:
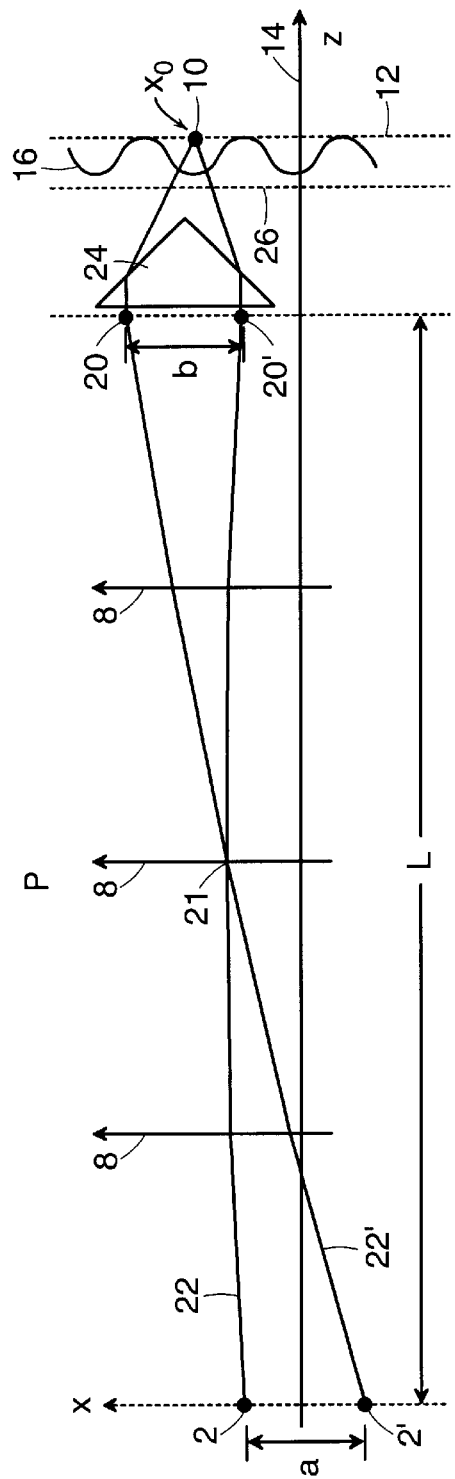
FIG. 2 is ray trace diagram of an embodiment of the invention.

Referring now to FIG. 2, one embodiment of the invention includes two mutually coherent light sources 2, 2' separated by a distance a which irradiate two target locations 20, 20' located a distance L from the sources 2, 2'. The two light sources 2, 2' may be generated from a single source and also may be broadband or laser sources. An optical combiner 24 in communication with the target locations 20, 20', directs the beams 22, 22' to the detector 12. The beams 22, 22' will combine at the location of the detector 12 to produce an interference pattern 16. The detector 12 is sensitive to intensity variations of the fringes so it can detect movement within the same fringe period. The detector 12 can also detect movement through whole fringe periods so determining the displacement of the point 10 is relatively straightforward and involves simply the counting of the passing fringe periods. In another embodiment of the invention, multiple detectors may be used including array detectors. By choosing a suitable separation a of the two sources 2, 2' and a suitable separation b of the two target locations 20, 20', where b is defined as the difference between the x-value at target location 20 and the x-value at target location 20' (for example, b is positive as drawn in FIG. 2), the atmospheric term in equation 2 above will be removed from the equation, for a = b. The equation for the OPD corresponding to FIG. 2 is:

$$OPD \approx (an_0/L)X_0 - (P_0 L/2)(a-b) \quad (3)$$

In a uniform temperature gradient, the atmospheric refraction error being accumulated is proportional to the distance between two points at the same z-location on two beam paths 22 and 22'. For example, the distance between the sources is, so the error being accumulated at z=0 is proportional to the distance. The reason for this is that the change in refractive index is proportional to the linear temperature gradient. Moving towards the center, the distance between the points on the beam paths 22 and 22' is less, and therefore the accumulated error is less. Reaching point 21 where the beams cross, the error is zero. Moving to the other side of the crossing point 21, the upper beam now becomes the lower beam and the lower beam becomes the upper beam. The error is now being accumulated in the opposite direction since the beams are switched. Since the gradient is uniform across the length L, the error that was accumulated on the left side of crossing point 21 is exactly undone by the opposite accumulation on the right side of crossing point 21. Therefore, when the separation a between the two sources 2, 2' is equal to the separation b between the two target locations 20, 20', the effect of the uniform temperature gradient is canceled. Hence, a is equal to b. In other words, this embodiment of the invention has effectively compensated for atmospheric effects due to a uniform temperature gradient 8 in the measurement environment. Therefore the OPD is given by the equation:

$$Opd \approx (an_0/L)x_0 \qquad (4)$$

in which all quantities except $x_0$ are known.

In certain circumstances it may be desirable to change the separation between the two sources 2, 2' or the two target locations 20, 20'. This will actually allow for the tuning of the apparatus to more effectively compensate for non-uniform temperature gradients.

Because both sources may irradiate both target locations, a technique must be used to differentiate which beams came from which source. This is required since the invention takes advantage of the geometry of the sources and the detectors in order to compensate for the atmospheric temperature gradient. In one embodiment, radiation from source 2' is directed at target 20, while radiation from source 2 is directed at target 20'. In this embodiment, the beams cross somewhere in the measurement environment. In order to manipulate the beams according to the invention, the source and the target of the radiation must be known.

Figure 3:
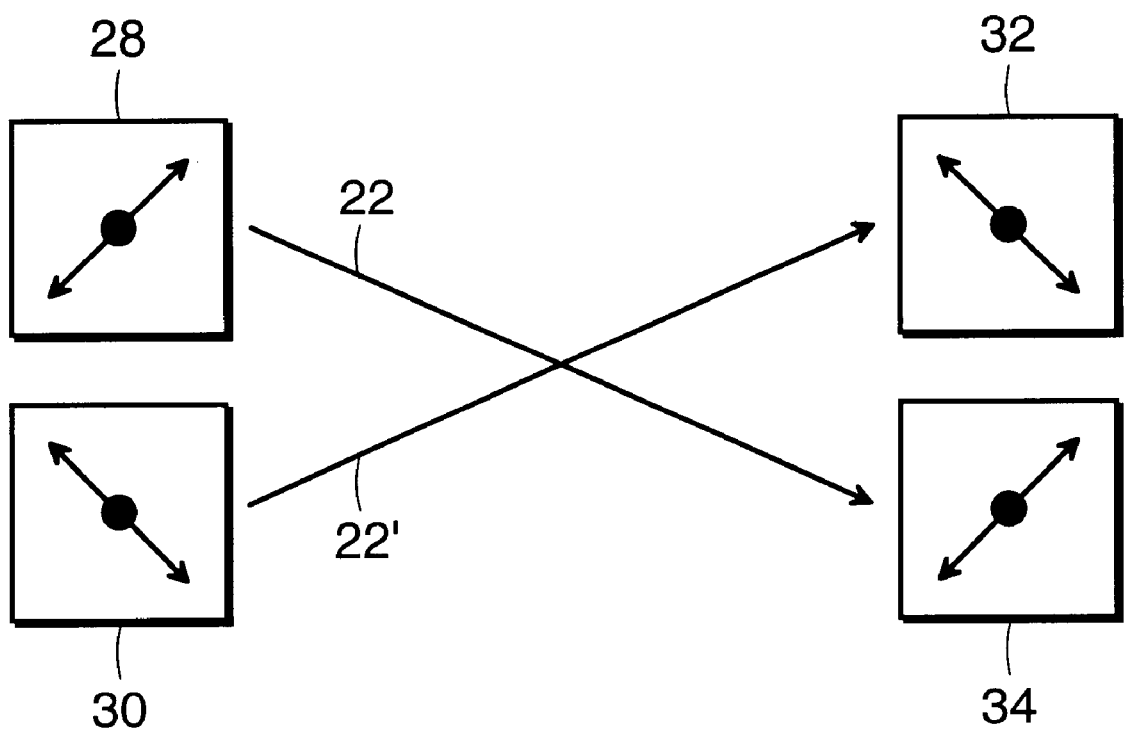
FIG. 3 is a diagram of an embodiment of the present invention using polarization tracking.

This beam tracking can be done in various ways. For example, in one embodiment of the invention, narrow coherent lasers may be used as sources 2, 2', each could be directed to irradiate only one target location 20 or 20'. Another embodiment of the invention uses polarization as shown in FIG. 3. Linear polarizers 28, 30 are orthogonal with respect to one another. Radiation from source 2 is directed into polarizer 28 allowing only linearly polarized light 22 to reach target location 20'. Radiation from source 2' is directed into polarizer 30 allowing only linearly polarized light 22' to reach target location 20. The two beams 22 and 22' are orthogonally polarized with respect to one another. Before these beams 22, 22' interfere and reach the detector, they pass through analyzers 32, 34, which are linearly polarized in the same orientation of the beams 22, 22'. This technique allows only the beam from the correct source 2, 2' to reach each target location 20, 20' and thereby produces a desired condition (for example, a =b ) in equation 3. In this embodiment, analyzer 26 is positioned just before the detector 12 to cause the cross polarized beams to interfere. In another embodiment according to FIG. 4, calcite 38 or another suitable material can be used to separate the beams into orthogonally polarized components and recombine the beams from such components.

Figure 4:
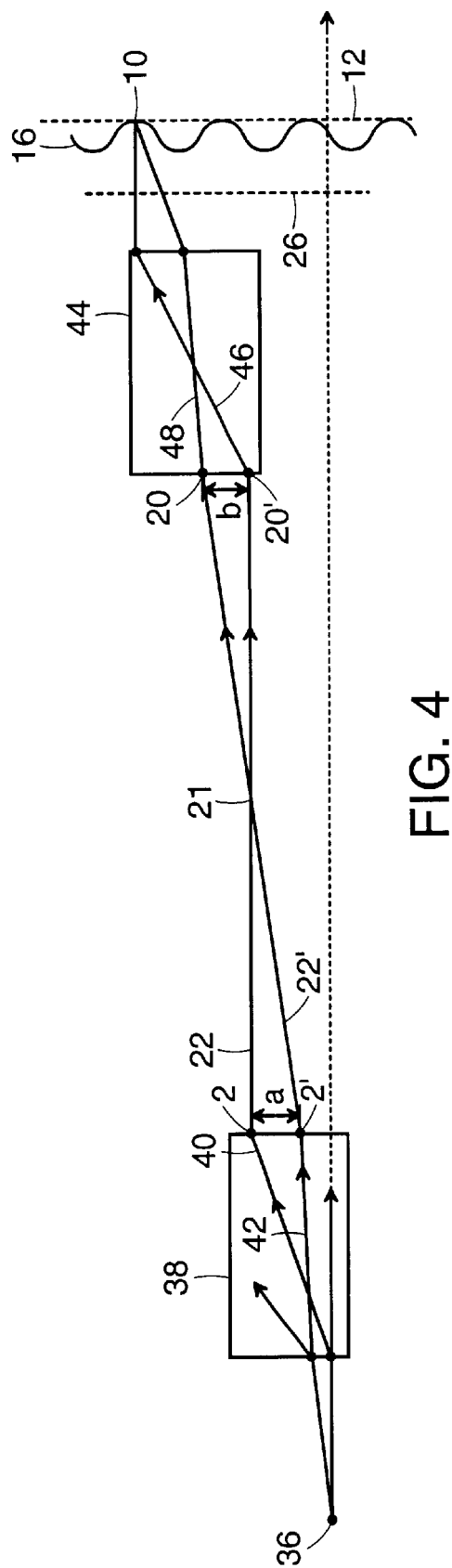
FIG. 4 is a highly schematic diagram of another embodiment of the invention.

In FIG. 4, source 36, which can be a broadband or laser source, directs radiation into crystal 38, which can be calcite or any other suitable birefringent material. Birefringent crystal 38 divides and diverts the radiation internally and produces extraordinary beam 40 and ordinary beam 42. Beams 40 and 42 become virtual sources 2 and 2' as they leave the crystal 38. Beams 22 and 22' are orthogonally polarized with respect to one another. As beams 22 and 22' propagate, they eventually encounter a detection birefringent crystal 44 which performs the function of recombining the beams in such a way as to produce an interference pattern on detector 12 after the beams traverse analyzer 26.

Figure 5:
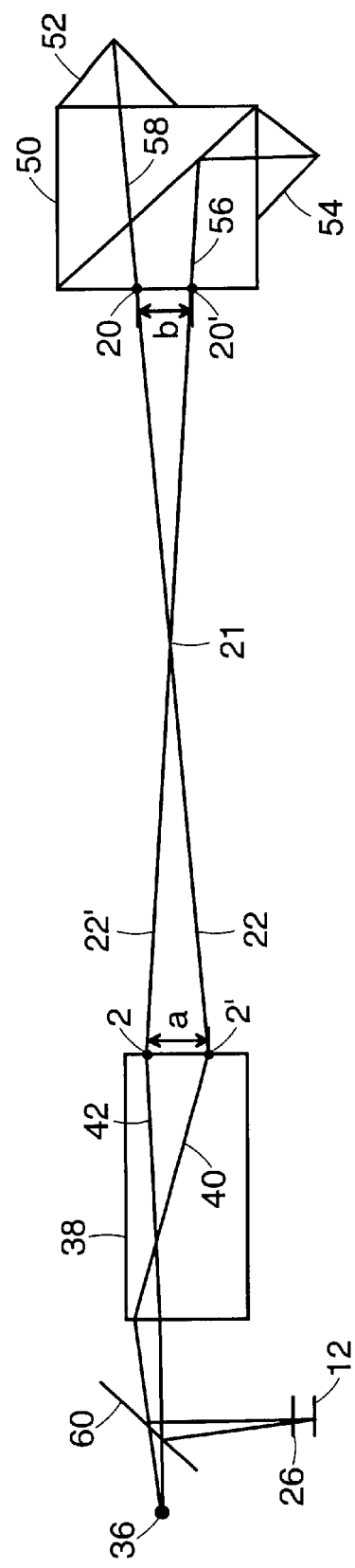
FIG. 5 is a highly schematic diagram of still another embodiment of the invention.

FIG. 5 depicts another embodiment of the invention. Since it may not be desirable to mount electronics and cables on the surface of the object, FIG. 5 illustrates an embodiment of the invention that addresses that issue. Here the analyzer 26 and the detector 12 are substantially adjacent to the source 36. A beam splitter 60 is positioned to allow radiation from source 36 to enter crystal 38 which generates beams 22 and 22' as above. Crystal 38 is a birefringent crystal which splits the polarization between beams 40 and 42. Beams 40 and 42 exit the crystal 38 and propagate as 22, 22' until they reach a target reflector 50. The target reflector in one embodiment is a polarizing beam splitter. Retro-reflectors 52 and 54, which may be corner cubes, are used to direct the beams 58 and 56 back to beam splitter 60. The separation b may be changed by adjusting retro-reflectors 52 and 54. This allows tuning of the apparatus for non-uniform temperature gradients. Beam splitter 60 directs the beams 22, 22' through the analyzer 26 to produce an interference pattern at detector 12. The analyzer 26 in one embodiment is a polarizer.

Figure 6A:
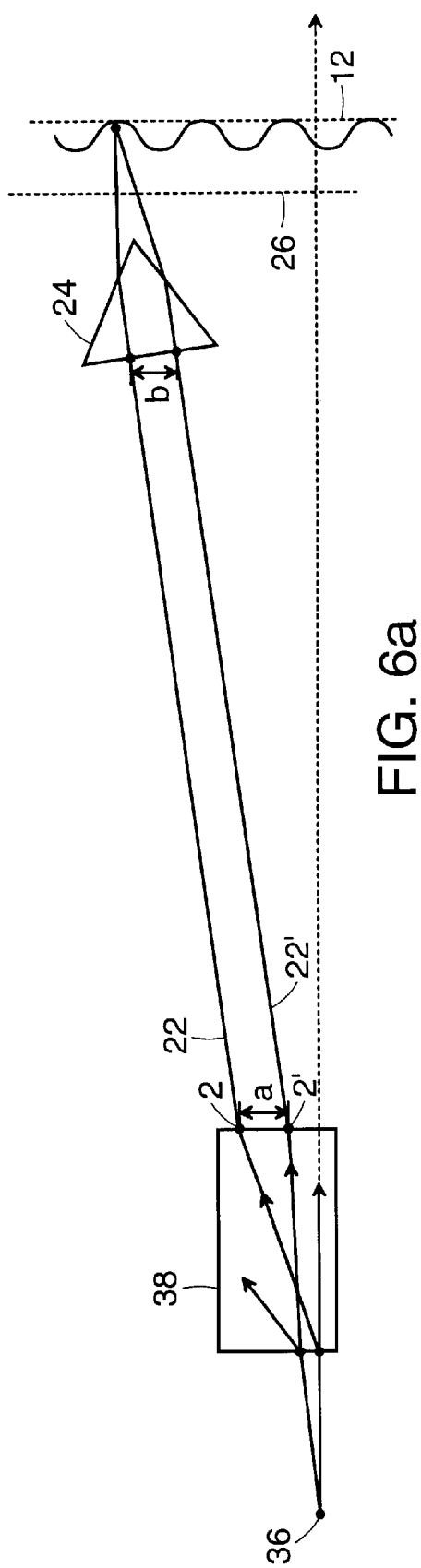
FIG. 6a is a highly schematic diagram of yet another embodiment of the invention.
Figure 6B:
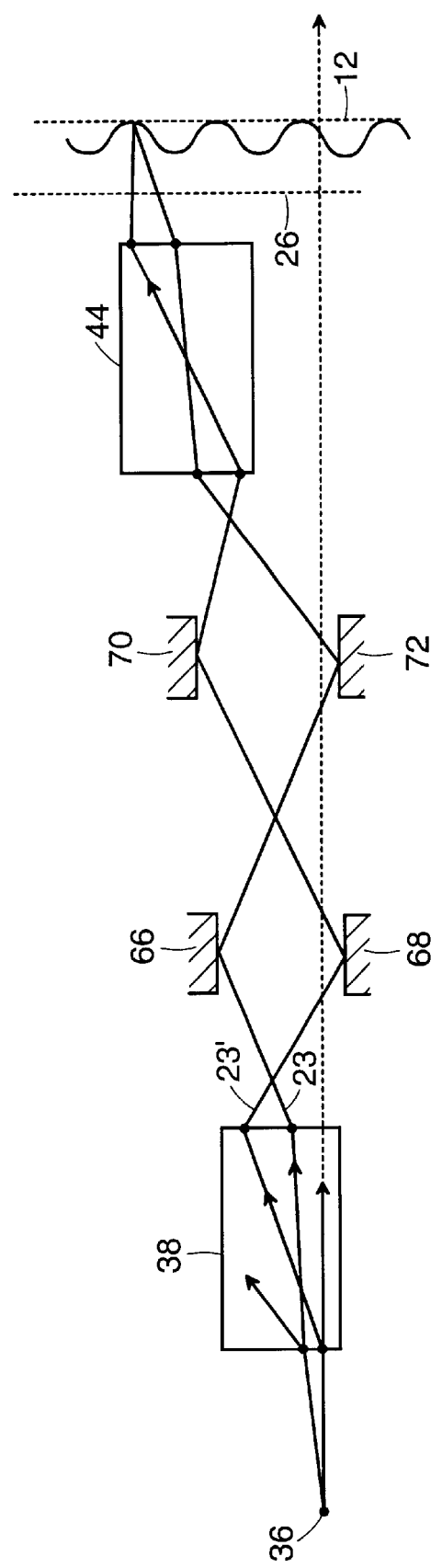
FIG. 6b is a highly schematic diagram of still another embodiment of the invention.

FIGS. 6a and 6b illustrate alternate embodiments of the invention. Turning to FIG. 6a, it can be shown that by taking two measurements for different values of b (for example b=0 and b=−a), the $P_0$ term in equation 3 can be eliminated. The physical apparatus may include two sources, or a single source 36 and two virtual sources 2, 2'. The apparatus also includes optical combiner 24, analyzer 26, and a detector 12. The apparatus may use multiple detectors including array detectors. Note that when using the polarization technique to track the beams as shown in the FIG. 6a embodiment of the invention, the axes of the analyzers 32 and 34 in FIG. 3 must be switched, since the beams are not crossed in the measurement environment. Moreover, with reference to FIG. 6a, depending on which beams from virtual sources 2 and 2' are tracked, it is possible to achieve the desired result of atmospheric refraction compensation with or without crossing the beams in the measurement environment.

In the embodiment of the invention as shown in FIG. 6a, beams 22 and 22' do not cross in the measurement environment. Source 36, which could be a broadband source or a laser source, illuminates crystal 38. Beams 22 and 22' are orthogonally polarized with respect to one another. As beams 22 and 22' propagate they are directed to optical combiner 24. As optical combiner 24 combines the beams, they pass through analyzer 26, which can be a polarizer, before producing an interference pattern on detector 12. Alternatively, as shown in FIG. 6b, multiple crossing points may be desirable and can be achieved by using reflectors 66, 68, 70, and 72 and crystal 44. In this embodiment, beams 23 and 23' propagate through the measurement environment and eventually reach crystal 44, where they are recombined, pass through an analyzer 26, and produce an interference pattern on detector 12. Again, by manipulating the beams 23, 23', the desired condition of atmospheric compensation can be satisfied.

Figure 7B:
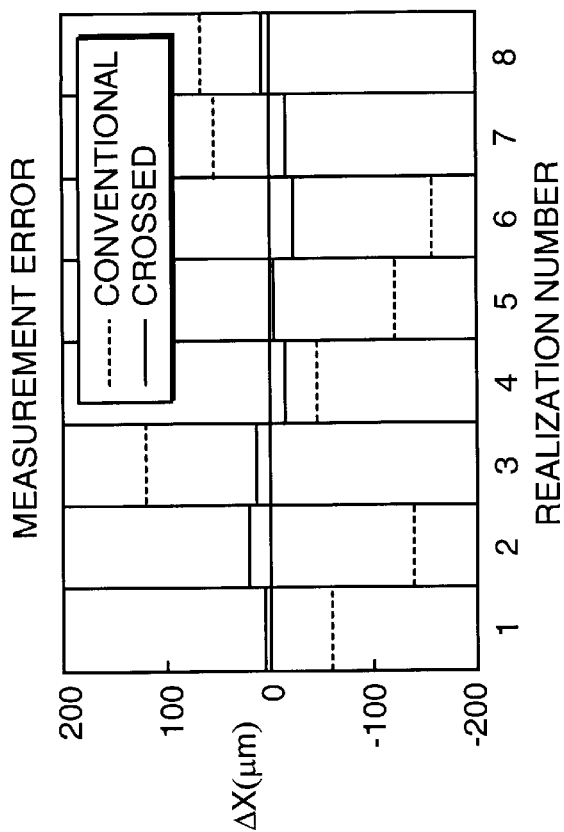
FIG. 7b is a graph of simulated measurement error due to the simulated random temperature gradients of FIG. 7a for both conventional measurement and reduced error measurement according to the invention.
Figure 7A:
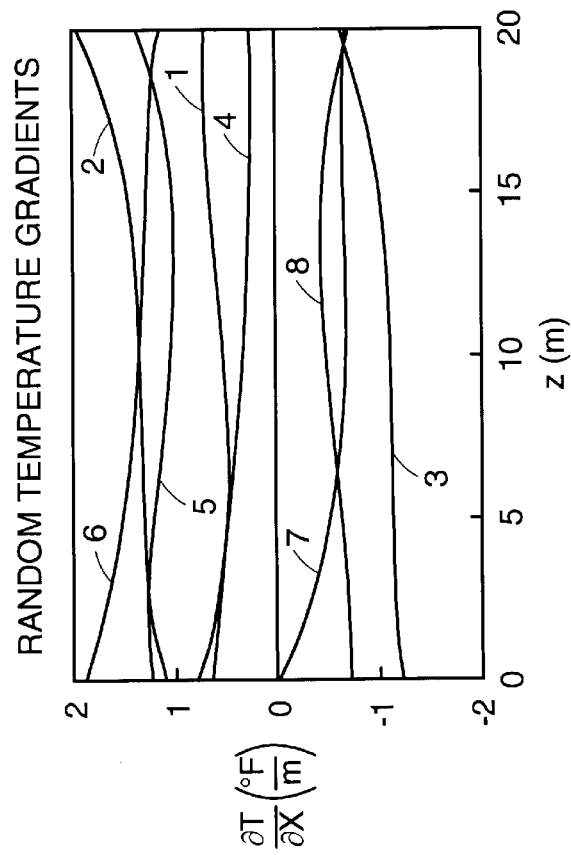
FIG. 7a is a graph of simulated random temperature gradients in a simulated measurement environment.

FIGS. 7a and 7b are graphs of the simulated results observed for random temperature gradients using the invention. The purpose of the simulation is to show that there is effective compensation even though the gradients in FIG. 7a are not exactly uniform. Simulated measurements were taken using a conventional measurement technique. The call-out numbers in FIG. 7a correspond to the realization numbers in FIG. 7b. The results of simulated conventional measurements are shown by the dotted lines in FIG. 7b. Simulated measurements using the invention are shown in FIG. 7b as solid lines. Note that the solid lines indicating the measurement error show less error in the measurement using the invention.

Figure 8:
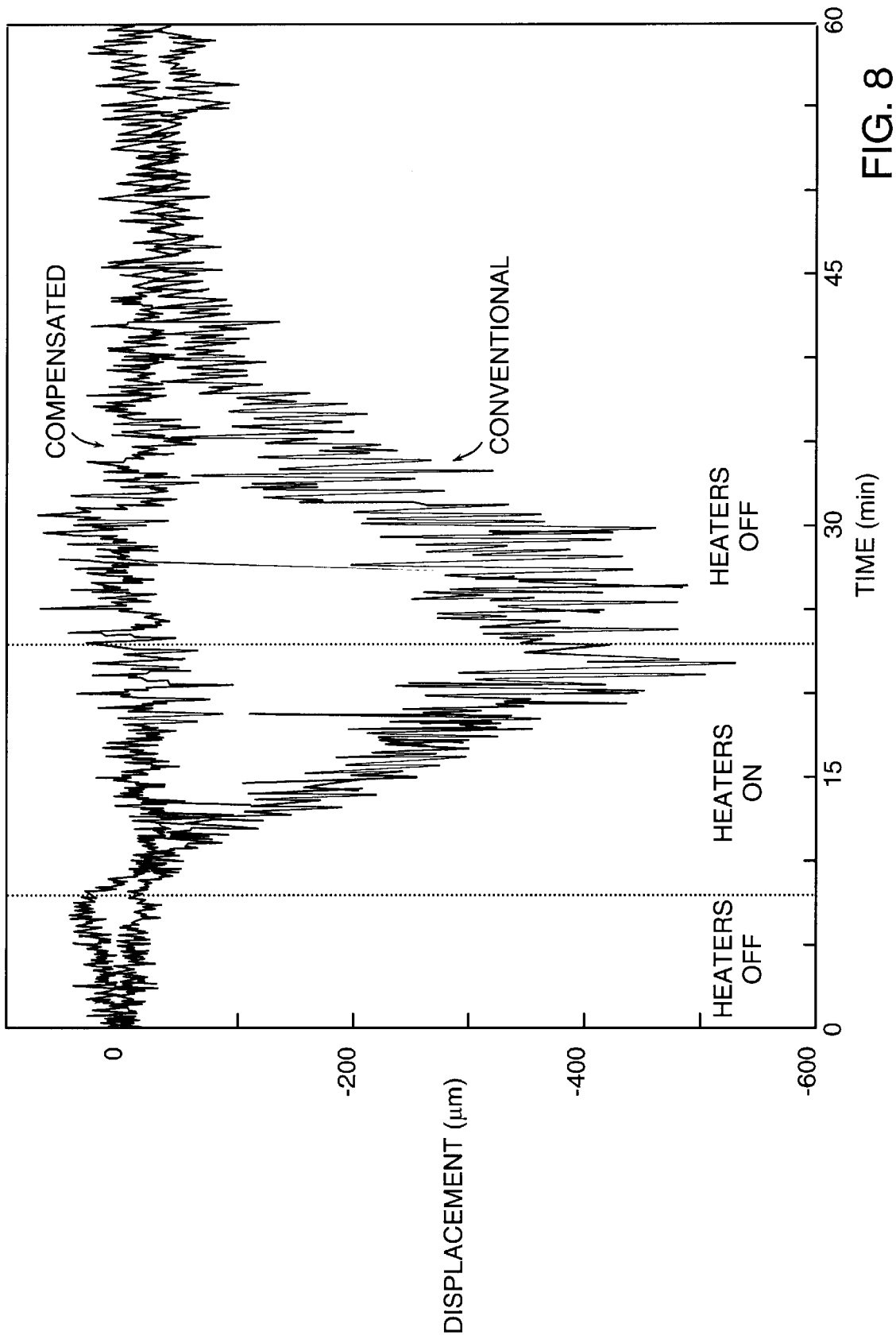
FIG. 8 is a graph of the measurement error for both conventional measurement and reduced error measurement using the embodiment of the invention shown in FIG. 5.

FIG. 8 shows actual measurement results for the embodiment of the invention shown in FIG. 5. As indicated in the FIG. 8, when heaters were activated in the measurement environment the technique used by the invention showed dramatic improvement in measurement accuracy.

Having described and shown the preferred embodiments of the invention, it will now become apparent to one of skill in the art that other embodiments incorporating the concepts may be used and that many variations are possible which will still be within the scope and spirit of the claimed invention. It is felt, therefore, that these embodiments should not be limited to disclosed embodiments but rather should be limited only by the spirit and scope of the following claims.

What is claimed is:

1. A method for compensating for measurement error due to refractive index variations in a measurement environment, said method comprising the steps of:
   providing a first source of radiation and a second source of radiation, said first source of radiation and said second source of radiation being separated by a first predetermined distance;
   irradiating a first target location with radiation from said first source of radiation through said refractive index variations in said measurement environment;
   irradiating a second target location with radiation from said second source of radiation through said refractive index variations in said measurement environment, said second target location separated from said first target location by a second predetermined distance;
   combining said radiation from said first and second target locations to generate optical interference at a third target location; and
   detecting radiation at said third target location to generate a signal having substantially reduced measurement error due to said refractive index variations in said measurement environment.

2. The method of claim 1 wherein said first and second sources are coherent with respect to one another.

3. The method of claim 1 wherein said first predetermined distance and said second predetermined distance are substantially equal.

4. The method of claim 1 wherein said first and second sources of radiation have a first wavelength and wherein said first predetermined distance is substantially proportional to said first wavelength of radiation from said first and second sources of radiation.

5. The method of claim 1 wherein said first and second sources are generated from a single source.

6. The method of claim 5 wherein said single source is a laser source.

7. The method of claim 1 wherein said first target location and said second target location are transposed.

8. The method of claim 1 wherein said refractive index variations are due to spatial temperature variations in the measurement environment.

9. The method of claim 1 wherein said first and second sources are laser sources.

10. The method of claim 1 wherein said first and second sources are broadband sources.

11. An apparatus for compensating for measurement error due to refractive index variations in a measurement environment, said apparatus comprising:
    a first source of radiation irradiating a first target location through said refractive index variations in said measurement environment;
    a second source of radiation irradiating a second target location through said refractive index variations in said measurement environment, said first and second sources of radiation separated by a first predetermined distance, said first and second target locations separated by a second predetermined distance;
    an optical combiner in optical communication with said first and second target locations; and
    a detector in optical communication with said optical combiner;
    wherein said optical combiner directs radiation from said first and second target locations to said detector, said detector generating a signal having substantially reduced measurement error due to said refractive index variations in said measurement environment.

12. The apparatus of claim 11 wherein said first and second sources are generated from a single source.

13. The apparatus of claim 12 wherein said single source is a laser source.

14. The apparatus of claim 11 wherein said first predetermined distance and said second predetermined distance is substantially the same.

15. The apparatus of claim 11 wherein said refractive index variations are due to spatial temperature variations in the measurement environment.

16. The apparatus of claim 11 wherein said first and second sources are laser sources.

17. The apparatus of claim 11 wherein said first and second sources are broadband sources.

18. The apparatus of claim 11 wherein said detector is located substantially adjacent to said first and second sources.

19. The apparatus of claim 18 further comprising an optical component in communication with said first and second sources and said optical combiner, said optical component directing radiation from said first and second target locations to said detector.

20. The method of claim 1, wherein said radiation from said first source of radiation intersects said radiation from said second source of radiation exactly once prior to irradiating said first and second target locations, respectively.

21. The method of claim 1, wherein said radiation from said first source of radiation intersects said radiation from said second source of radiation more than once prior to irradiating said first and second target locations, respectively.

22. The method of claim 1, wherein said radiation from said first source of radiation does not intersect said radiation from said second source of radiation prior to irradiating said first and second target locations, respectively.

23. The method of claim 1, wherein said step of detecting radiation at said third target location comprises reflecting said radiation from said first and second target locations.

24. The method of claim 23, wherein said step of detecting radiation at said third target location comprises detecting said radiation proximate to said first and second sources.

25. The method of claim 1, wherein said step of combining said radiation comprises reflecting said radiation from said first and second target locations prior to combining said radiation to generate optical interference at said third target location.

26. The method of claim 1, wherein said third target location is proximate to said first and second sources of radiation.

27. The apparatus of claim 11, wherein said radiation from said first source of radiation intersects said radiation from said second source of radiation exactly once prior to irradiating said first and second target locations, respectively.

28. The apparatus of claim 11, wherein said radiation from said first source of radiation intersects said radiation from said second source of radiation more than once prior to irradiating said first and second target locations, respectively.

29. The apparatus of claim 11, wherein said radiation from said first source of radiation does not intersect said radiation from said second source of radiation exactly once prior to irradiating said first and second target locations, respectively.

30. The apparatus of claim 11, wherein said optical combiner receives radiation from said first and second target locations.

31. The apparatus of claim 11, wherein said optical combiner receives radiation reflected from said first and second target locations.

32. The apparatus of claim 31, wherein said optical combiner is located proximate to said first and second sources.

33. The apparatus of claim 11, wherein said first target location and said second target location are transposed.

34. The apparatus of claim 11, wherein said detector comprises a photodetector.

* * * * *

UNITED STATES PATENT AND TRADEMARK OFFICE
CERTIFICATE OF CORRECTION

| | | |
|---|---|---|
| PATENT NO. | : 6,229,619 B1 | Page 1 of 1 |
| APPLICATION NO. | : 09/325177 | |
| DATED | : May 8, 2001 | |
| INVENTOR(S) | : Lyle Shirley | |

It is certified that error appears in the above-identified patent and that said Letters Patent is hereby corrected as shown below:

Delete the paragraph titled 'GOVERNMENT SUPPORT' encompassing column 1, line 17-20:

"Work described herein was supported by Federal Contract No. F19628-95-L-002, awarded by the United States Air Force. The Government may have certain rights in the invention."

and replace with:

--This invention was made with government support under Contract No. F19628-95-C-0002 awarded by the U.S. Air Force. The government has certain rights in this invention.--

Signed and Sealed this

Twenty-seventh Day of November, 2012

David J. Kappos
*Director of the United States Patent and Trademark Office*